US009230370B2

(12) United States Patent
Yen et al.

(10) Patent No.: US 9,230,370 B2
(45) Date of Patent: Jan. 5, 2016

(54) METHOD AND SYSTEM FOR DETERMINING A STATUS OF AT LEAST ONE MACHINE AND COMPUTER READABLE STORAGE MEDIUM STORING THE METHOD

(71) Applicant: INSTITUTE FOR INFORMATION INDUSTRY, Taipei (TW)

(72) Inventors: Chun-Tai Yen, Taipei (TW); Chih-Chiang Kao, Taoyuan County (TW); I-Lin Liu, New Taipei (TW); Ren-Dar Yang, Hsinchu (TW); Hung-Sheng Chiu, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 494 days.

(21) Appl. No.: 13/714,450

(22) Filed: Dec. 14, 2012

(65) Prior Publication Data

US 2014/0142738 A1 May 22, 2014

(30) Foreign Application Priority Data

Nov. 22, 2012 (TW) ............................ 101143695 A

(51) Int. Cl.
*G06F 17/00* (2006.01)
*G07C 3/08* (2006.01)

(52) U.S. Cl.
CPC ....................................... *G07C 3/08* (2013.01)

(58) Field of Classification Search
CPC .................................. G07C 3/08; G06F 17/00
USPC ......................................................... 700/108
See application file for complete search history.

(56) References Cited

U.S. PATENT DOCUMENTS

| | | | | |
|---|---|---|---|---|
| 6,384,560 | B1 * | 5/2002 | Kakino et al. | 318/566 |
| 6,961,637 | B2 * | 11/2005 | Scherer | 700/173 |
| 7,409,261 | B2 * | 8/2008 | Jalluri et al. | 700/174 |
| 8,041,520 | B2 * | 10/2011 | Mesec | 702/58 |
| 8,639,458 | B2 * | 1/2014 | Bechhoefer et al. | 702/56 |
| 2009/0030545 | A1 * | 1/2009 | Masuya et al. | 700/175 |
| 2011/0063122 | A1 * | 3/2011 | Matsubara et al. | 340/679 |

FOREIGN PATENT DOCUMENTS

| | | | |
|---|---|---|---|
| CN | 101278202 | A | 10/2008 |
| CN | 101587161 | A | 11/2009 |
| TW | 200823464 | A | 6/2008 |
| TW | 201035567 | A | 10/2010 |

* cited by examiner

*Primary Examiner* — Robert Fennema
*Assistant Examiner* — Sivalingam Sivanesan
(74) *Attorney, Agent, or Firm* — CKC & Partners Co., Ltd.

(57) ABSTRACT

A method for determining a status of at least one machine includes the following steps: a processing unit is utilized to receive and record spindle load values of the spindle in a period of time to generate a spindle load record of the spindle, and to determine if a preset condition is matched according to the spindle load record. When the preset condition is matched, the processing unit is utilized to determine a present category corresponding to the spindle load record of the spindle, and to obtain parameter-to-be-collected information corresponding to the present category. The processing unit is utilized to obtain at least one value of at least one collected parameter of the at least one machine according to the parameter-to-be-collected information corresponding to the present category, and to determine a status of the at least one machine according to the obtained value of the at least one collected parameter.

17 Claims, 3 Drawing Sheets

METHOD AND SYSTEM FOR DETERMINING A STATUS OF AT LEAST ONE MACHINE AND COMPUTER READABLE STORAGE MEDIUM STORING THE METHOD

RELATED APPLICATIONS

This application claims priority to Taiwan Application Serial Number 101143695, filed Nov. 22, 2012, which is herein incorporated by reference.

BACKGROUND

1. Technical Field

The present invention relates to a method and system for determining a status of at least one machine and a computer readable storage medium for storing the method. More particularly, the present invention relates to a method, system and computer readable storage medium for determining a corresponding category according to spindle loading of at least one machine and determining a status of the at least one machine according to machine parameter obtained according to the corresponding category.

2. Description of Related Art

As industries progresses, many automatic machines are developed for executed different kinds of automatic processes. Hence, machines can also accomplish many complicated factory labor processes.

Since machines can execute more complicated functions, there are more possible fault causes which causes machines break down. Especially, those high precision manufacturing or testing machines include many components, which also increases possible fault cause. For finding the fault causes, parameters of machines are acquired for determining the status of the machines. Nowadays, machines are set up at many different locations. Accordingly, remote monitoring systems may be installed for monitoring statuses of such machines according to all parameters acquired through communication networks. Hence, when a machine breaks down, the acquired parameters can be utilized to determine if any abnormality occurs and further determine the possible fault cause abnormality. However, because there are large amount of machines and many different parameters data for each machine need to be transmitted for monitoring, it needs high transmission bandwidth and high cost.

Accordingly, there is a need to collect parameter data of the remote machines without high cost.

SUMMARY

According to one embodiment of this invention, a method for determining a status of at least one machine is disclosed. In the method, load values of a spindle of a machine are utilized to determine if a preset condition is matched, and at least one corresponding parameter, which is utilized for determining a status of the machine, is obtained according to a present category for when the preset condition is matched. The at least one machine includes a spindle. The method includes the following steps: a processing unit is utilized to receive and record several spindle load values of the spindle in a period of time to generate a spindle load record of the spindle, and to determine if a preset condition is matched according to the spindle load record. When the preset condition is matched, the processing unit is utilized to determine a present category corresponding to the spindle load record of the spindle, and to obtain parameter-to-be-collected information corresponding to the present category. The processing unit is utilized to obtain at least one value of at least one collected parameter of the machine according to the parameter-to-be-collected information corresponding to the present category, and to determine a status of the at least one machine according to the obtained value of the at least one collected parameter.

According to another embodiment of this invention, a computer-readable storage medium storing a computer program for executing the steps of the afore-mentioned method for determining a status of at least one machine is provided. Steps of the method are as disclosed above.

According to another embodiment of this invention, a system for determining a status of at least one machine is provided. The system includes a data communication interface and a processing unit. The processing unit builds a connection with the data communication interface. The data communication interface builds a connection with at least one machine. The machine includes a spindle. The processing unit includes an information processing module, a classifying module and a determining module. The information processing module receives and records several spindle load values of the spindle in a period of time to generate a spindle load record of the spindle, and determines if a preset condition is matched according to the spindle load record. When the preset condition is matched, the classifying module determines a present category corresponding to the spindle load record of the spindle and obtains parameter-to-be-collected information corresponding to the present category. The determining module obtains at least one value of at least one collected parameter of the machine according to the parameter-to-be-collected information corresponding to the present category, and determines a status of the at least one machine according to the obtained value of the at least one collected parameter.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the folio detailed description of the embodiments, with reference made to the accompanying drawings as follows.

DETAILED DESCRIPTION

Figure 1:
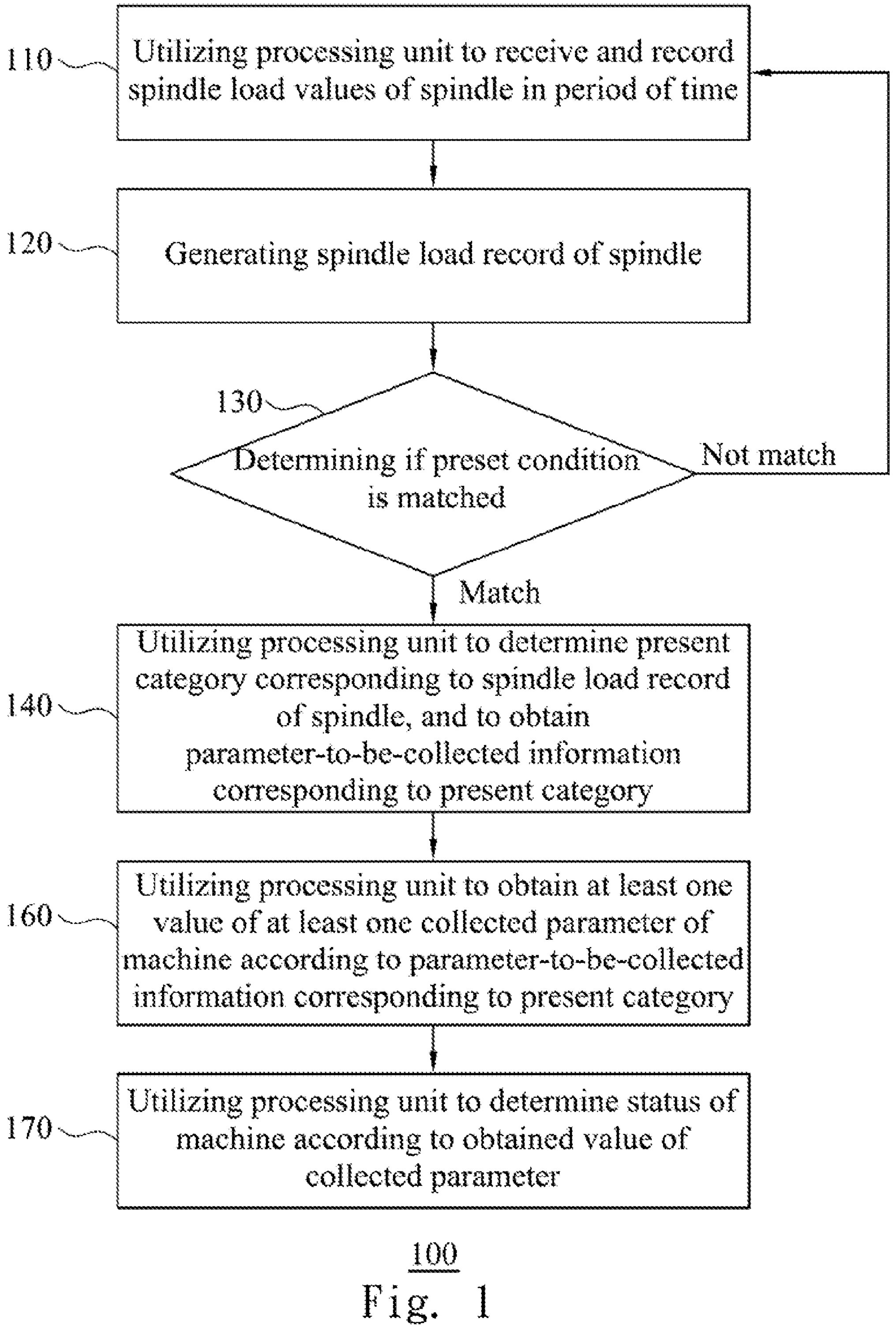
FIG. 1 is a flow diagram of a method for determining a status of at least one machine according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a method for determining a status of at least one machine according to one embodiment of this invention. In the method, load values of a spindle of a machine are utilized to determine if a preset condition is matched. When the preset condition is matched, at least one corresponding parameter, which is utilized for determining a status of the machine, is obtained according to a present category. In some embodiments, the method may be carried out by running a computer program which is stored on a computer-readable storage medium having computer-readable instructions embodied in the medium, such that computers (for example, servers, personal computers, industrial computers, embedded systems, etc.) can read the computer program and carry out the method for determining the status of the machine. Any suitable storage medium (such as non-transitory medium) may be used. For example, suitable storage medium can be non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); or magnetic storage devices such as hard disk drives (HDD) and floppy disk drives.

The method 100 for determining a status of at least one machine, which includes a spindle, includes the following steps:

At step 110, a processing unit is utilized to receive and record several spindle load values of the spindle in a period of time.

At step 120, a spindle load record of the spindle is generated according to the recorded spindle load values. In some embodiments, the spindle load record of the spindle can be represents as a wave diagram, which represents the continuous spindle load values of the spindle in the period of time. For example, times and spindle load values are taken as two axes of the wave diagram. In some other embodiments, the period of time can be set to 10 seconds, 1 minute, 1 hour, 1 day or any other preset time length.

At step 130, determine if a preset condition is matched according to the spindle load record. In some embodiments, the preset condition is one of a preset peak count, a preset peak position, a preset peak value, or is combination thereof. Hence, in some embodiments of step 130, the processing unit can be utilized to analyze the spindle load record of the spindle to obtain one of a peak count, a peak position, a peak value of the spindle load record, or combination thereof. Hence, the processing unit determines if the preset condition is matched by comparing the peak count of the spindle load record with the preset peak count, by comparing the peak position of the spindle load record with the preset peak position, or by comparing the peak value of the spindle load record with the preset peak value. For example, the fore-mentioned determination may be made as one of the following ways, or combination thereof: determine if the difference between the peak count of the spindle load record in the period of time (for example, 1 minute) and the preset peak count is less than a preset value, determine if difference between the peak position of the spindle load record (for example, distance between two peak points of two neighboring waves in the wave diagram) and the preset peak position is less than a preset value, or determine if difference between the peak value of the spindle load record and the preset peak value is less than a preset value.

When it is determined that the preset condition is not matched, the processing unit is utilized to receive and record spindle load values of the spindle (step 110).

At step 140, when the preset condition is matched, the processing unit is utilized to determine a present category corresponding to the spindle load record of the spindle, and to obtain parameter-to-be-collected information corresponding to the present category. In some embodiments of this invention, a storage unit is utilized to store several category records. Each of the category records includes a category name and the spindle load record and the parameter-to-be-collected information corresponding to the category name. Hence, the processing unit determines one of the category names as the present category according to the spindle load record of the spindle and the category records.

In some embodiments, the category records for the processing unit to determine if the preset condition is matched and to determine the present category corresponding to the spindle load record can be merged. For example, the data in the spindle load record may be the fore-mentioned peak count, peak position and peak value, and the data corresponding to the category names of the category records may be the fore-mentioned preset condition. The category names may be chatter category, chipped category, spindle wear category, over-loading category, abnormal category, etc. The (condition) data corresponding to the category names may be "larger than a peak-count upper threshold," "smaller than the peak-count lower threshold," "not in a preset peak interval," "larger than a peak-value upper threshold," "smaller than a peak-value lower threshold," etc. For example, the processing unit may determine if the preset condition is matched by determining if the peak count of the spindle load record is larger than a peak-count upper threshold. When it is determined matched, the processing unit may take the category name corresponding to "larger than a peak-count upper threshold" as the present category from the category names and the spindle load records stored in the storage unit.

In some other embodiments, the spindle load records corresponding to the category names can be partially the same with or different from the fore-mentioned preset condition. For example, the preset condition may be a preset peak-count number, and the spindle record is "another setting peak-count number different from the preset peak-count number in a setting peak interval," or "not in a preset peak interval," "larger than a peak-value upper threshold" "smaller than a peak-value lower threshold," etc.

At step 160, the processing unit is utilized to obtain at least one value of least one collected parameter of the machine according to the parameter-to-be-collected information corresponding to the present category.

At step 170, the processing unit is utilized to determine a status of the at least one machine according to the obtained value of the at least one collected parameter. Furthermore, each of the category records may further include history for collected parameters. Hence, the processing unit may determine the status of the machine by determining if the obtained value of the at least one collected parameter of the machine matches any of values of the history corresponding to the present category. When matches, it is determined that the status of the at least one machine is the present category. When not matches, the processing unit further determines one of the category names other than the present category as an updated present category after update according to the spindle load record of the spindle and the category records. Subsequently, the processing unit may obtain at least one collected parameter of the machine according to the updated present category for the match determination. If still not matches, fore-mentioned steps may be repeated until all categories are checked or it is determined matches.

Therefore, the status of the machine can be roughly determined only with the spindle load values of the machine. Hence, the status of the machine can be determined utilizing low-performance hardware, which can reduce hardware cost. In addition, when there is a need to understand the status of the machine more precisely, only part of the collected parameter should be obtained according to the present category, which is determined with the spindle load values, which does not require high-performance hardware either and can reduce the time for performing such determination.

In some embodiments of this invention, the method 100 may further include the following steps: when the status of the machine can not be determined according to the obtained value of the collected parameter, the processing unit may further determine machine-parameter information other than the parameter-to-be-collected information, and obtain at least one value of at least one machine parameter of the machine according to the machine-parameter information. Hence, the processing unit can determine the status of the machine according to the obtained value of the collected parameter and the obtained value of the machine parameter. In other words, when the obtained value of the collected parameter is not sufficient for determining the status of the machine, the status of the machine can be determined according to the obtained value of the collected parameter and some other additional parameters, such as machine parameters. When the additional parameters are determined, the processing unit may obtain the value of the parameter according to the parameter-to-be-collected information and the machine-parameter information again, such that values of the parameters at the same time interval can be utilized for status determination, which can perform status determination more precisely.

In some embodiments of this invention, the processing unit can determine if the preset condition is matched or determine the present category corresponding to the spindle load values by one of the following methods. For example, in some embodiments of step 130 the processing unit may be utilized to determine if the peak count of the spindle load record is larger than a peak-count upper threshold or smaller than a peak-count lower threshold. When it is determined that the fore-mentioned preset condition is matched, the present category and parameters to be collected can be determined at step 140. For example, when the processing unit determines that the peak count of the spindle load record is larger than the peak-count upper threshold, the processing unit determines that the present category is a chatter category and the parameter-to-be-collected information corresponding to the present category includes a parameter for checking spindle-chatter, which may include a temperature of the spindle, a rotation speed of the spindle and a pitch error compensation. When the processing unit determines that the peak count of the spindle load record is smaller than the peak-count lower threshold, the processing unit determines that the present category is a chipped category and the parameter-to-be-collected information corresponding to the present category includes at least one parameter for checking spindle-chipped.

In some other embodiments of step 130, the processing unit may be utilized to determine if the peak position of the spindle load record is in a preset peak interval for determining if the preset condition is matched. When the peak position of the spindle load record is not in the preset peak interval, the processing unit determines that the present category is a tool wear category and the parameter-to-be-collected information corresponding to the present category includes at least one parameter for checking spindle wear (far example, spindle vibration frequency). Hence, in some embodiments of step 170, the processing unit may determine that the status of the machine is spindle wear when the spindle vibration frequency of the spindle is not within a normal frequency range.

In some other embodiments of step 130, the processing unit is utilized to determine if the peak value of the spindle load record is larger than a peak-value upper threshold or smaller than a peak-value lower threshold for determining if the preset condition is matched. When the processing unit determines that the peak value of the spindle load record is larger than the peak-value upper threshold, the processing unit may determine that the present category is an over-loading category and the parameter-to-be-collected information corresponding to the present category may include at least one parameter for checking overloading at step 140. When the processing unit determines that the peak value of the spindle load record is smaller than the peak-value lower threshold, the processing unit may determine that the present category is a tool abnormal category and the parameter-to-be-collected information corresponding to the present category comprises at least one parameter for checking spindle abnormality.

Figure 2:
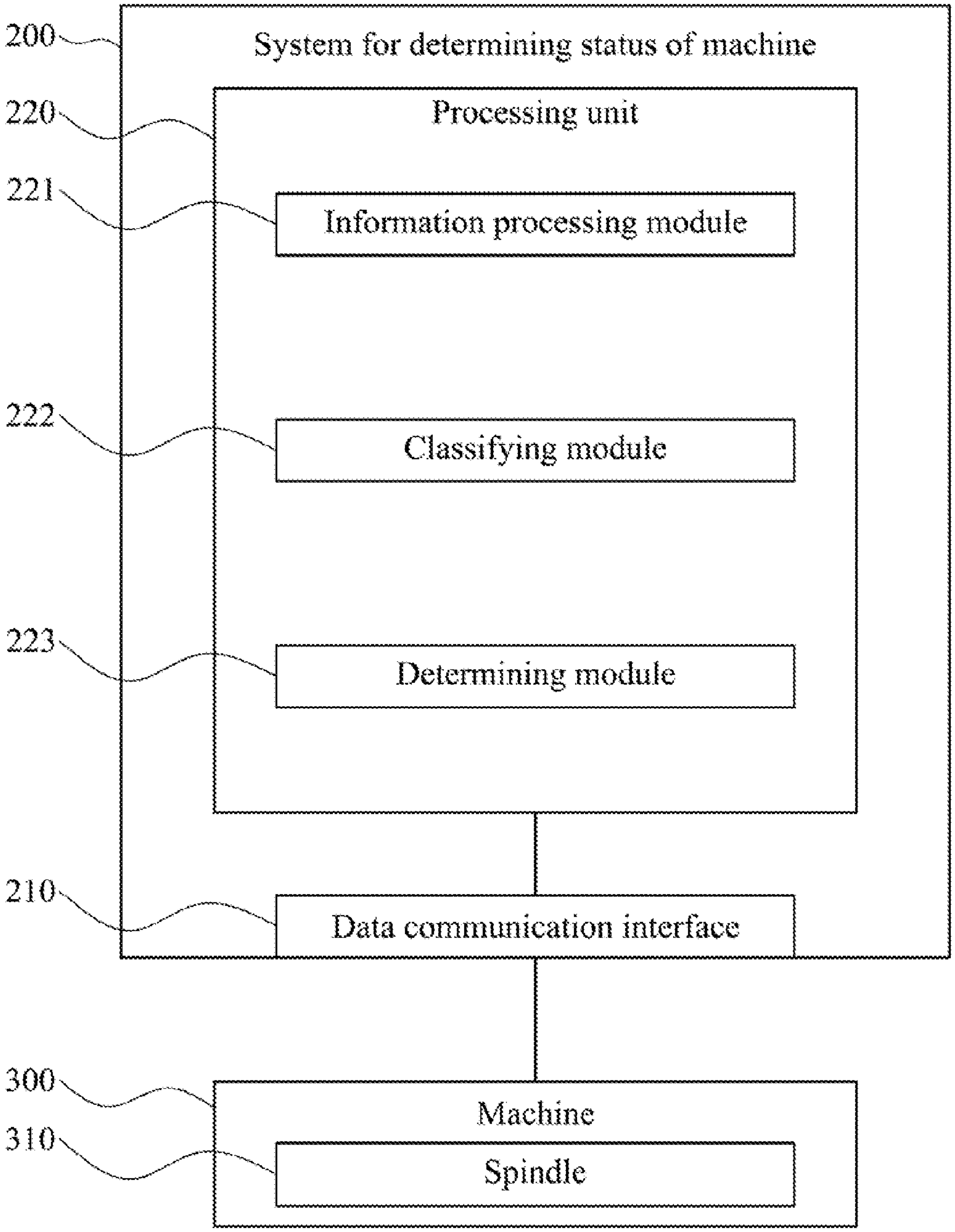
FIG. 2 illustrates a block diagram of a system for determining a status of at least one machine according to an embodiment of this invention.

FIG. 2 illustrates a block diagram of a system for determining a status of at least one machine according to an embodiment of this invention. The system 200 for determining a status of at least one machine includes a data communication interface 210 and a processing unit 220. The data communication interface 210 builds a connection with at least one machine 300. The machine 300 includes a spindle 310.

The processing unit 220 builds a connection with the data communication interface 210. In some embodiments of this invention, the data communication interface 210 and the processing unit 220 may be implemented by a processing unit built in the machine 300. In some other embodiments, the data communication interface 210 and the processing unit 220 may be implemented by another electrical device (for example, a set top box or a ServBox), which is connected with the machine 300. In some other embodiments, the processing unit 220 may be discretely implemented by machine 300 and several electrical devices, which have connection with the machine 300, which should not be limited in this disclosure.

The processing unit 220 includes an information processing module 221, a classifying module 222 and a determining module 223. The information processing module 221 receives and records several spindle load values of the spindle 310 of the machine 300 in a period of time to generate a spindle load record of the spindle 310. In some embodiments, cutting current values of the spindle 310 may be taken as the spindle load values of the spindle 310. In some other embodiments, any other type of load value detected from the spindle 310 may be taken as the spindle load values of the spindle 310. In addition, the information processing module 221 may keep send instructions to request machine 300 to reply its spindle load values.

Subsequently, the information processing module 221 determines if a preset condition is matched according to the spindle load record. When the preset condition is not matched, the information processing module 221 keeps receiving and recording several spindle load values of the spindle 310

When the preset condition is matched, the classifying module 222 determines a present category corresponding to the spindle load record of the spindle and obtains parameter-to-be-collected information corresponding to the present category.

The determining module 223 obtains at least one value of at least one collected parameter of the machine according to the parameter-to-be-collected information corresponding to the present category, and determines a status of the at least one machine 300 according to the obtained value of the at least one collected parameter. Therefore, the system can roughly determine the status of the machine 300 only with the spindle load values of the machine 300. Hence, the system 200 can be implemented with low-performance hardware, which can reduce hardware cost. In addition, when there is a need to understand the status of the machine more precisely, only part of the collected parameter should be obtained according to the present category, which is determined with the spindle load values, which does not require high-performance hardware either and can reduce the time for performing such determination. Accordingly, the system can easily determine statuses of several machines.

When the determining module 223 can not determine the status of the machine according to the obtained value of the collected parameter, the determining module 223 can further determine machine-parameter information other than the parameter-to-be-collected information. Subsequently, the determining module 223 further obtains at least one value of at least one machine parameter of the machine according to the machine-parameter information, and determines the status of the machine according to the obtained value of the collected parameter and the obtained value of the machine parameter.

Figure 3:
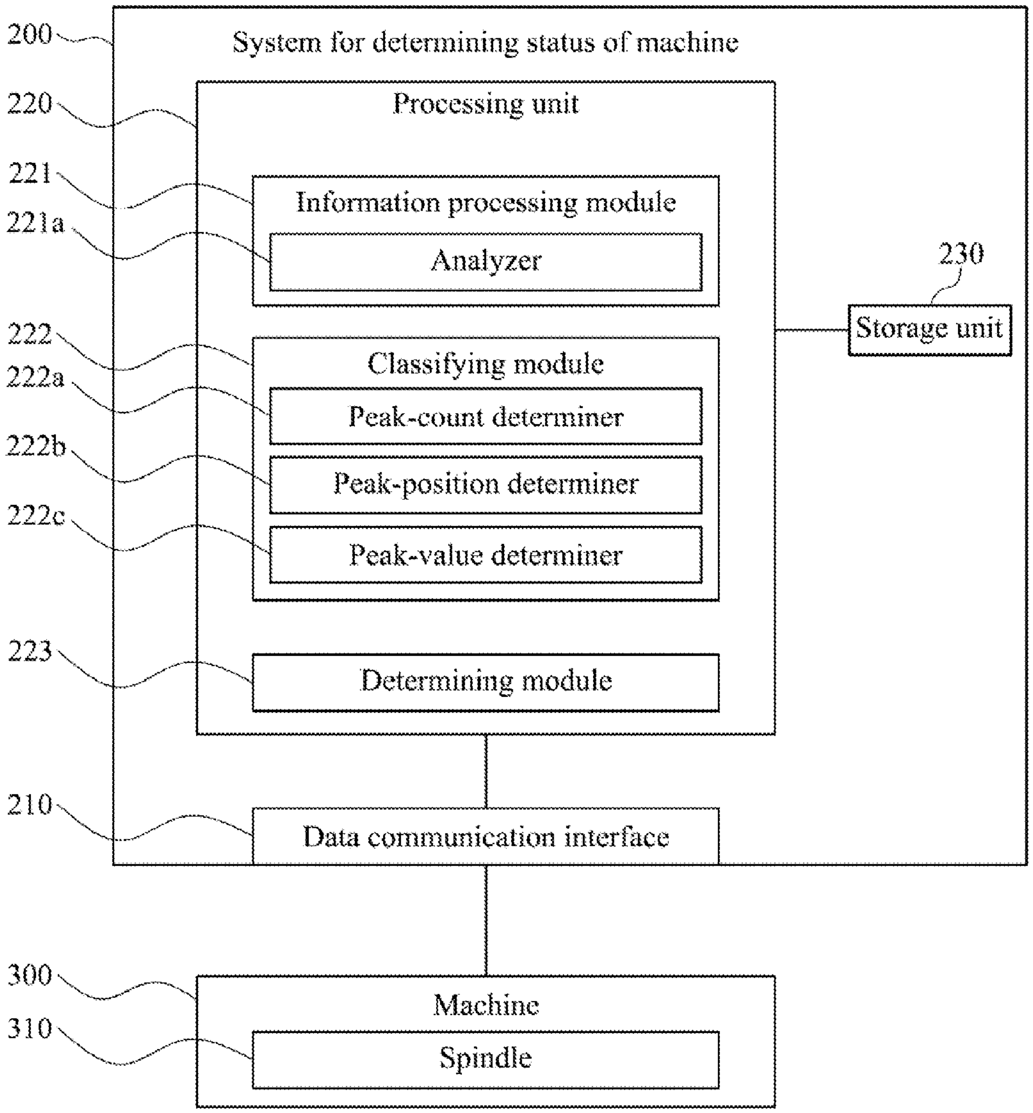
FIG. 3 illustrates a block diagram of a system for determining a status of at least one machine according to another embodiment of this invention.

FIG. 3 illustrates a block diagram of a system for determining a status of at least one machine according to another embodiment of this invention. It is to be understood that aspects of this embodiment similar to those described with reference to FIG. 2 may not be repeated.

The system 200 may further include a storage unit 230. The storage unit 230 stores several category records. Each of the category records includes a category name and the spindle load record and the parameter-to-be-collected information corresponding to the category name. The classifying module 222 determines one of the category names as the present category according to the spindle load record of the spindle 310 and the category records stored in the storage unit 230. In addition, each of the category records further includes history for collected parameters corresponding to each of the category names. The determining module 223 determines the status of the machine 300 by determining if the obtained value of the collected parameter matches any of the history corresponding to the present category. When matches, the classifying module 222 determines that the status of the at least one machine is the present category. When not matches, the classifying module 222 further determines one of the category names other than the present category as an updated category after update according to the spindle load record of the spindle and the category records.

The spindle load record may be a wave diagram, which represents the spindle load values of the spindle in the period of time. The preset condition may be selected from a preset peak count, a preset peak position and a preset peak value. Hence, the information processing module 221 may determine if the preset condition is matched according to the relation between the spindle load record and the preset condition.

In some embodiments, the processing unit 220 may merge the category records for determining if the preset condition is matched and for determining the present category corresponding to the spindle load record. For example, the data in the spindle load record may be the fore-mentioned peak count, peak position and peak value, and the data corresponding to the category names of the category records may be the fore-mentioned preset condition. The category names may be chatter category, chipped category, spindle wear category, over-loading category, abnormal category, etc. The (condition) data corresponding to the category names may be "larger than a peak-count upper threshold," "smaller than the peak-count lower threshold," "not in a preset peak interval," "larger than a peak-value upper threshold," "smaller than a peak-value lower threshold," etc.

In some other embodiments, the spindle load records corresponding to the category names can be partially the same with or different from the fore-mentioned preset condition. For example, the preset condition may be a preset peak-count number, and the spindle record is "another setting peak-count number different from the preset peak-count number in a setting peak interval", or "not in a preset peak interval," "larger than a peak-value upper threshold," "smaller than a peak-value lower threshold," etc.

An analyzer 221*a* of the information processing module 221 may analyze the spindle load record of the spindle to obtain a peak count, a peak position or a peak value of the spindle load record. Subsequently, the information processing module 221 may determine if the preset condition is matched by comparing the peak count of the spindle load record with the preset peak count, by comparing the peak position of the spindle load record with the preset peak position, or by comparing the peak value of the spindle load record with the preset peak value.

The information processing module 221 may perform determination by determining if the peak count of the spindle load record is larger than a peak-count upper threshold or smaller than a peak-count lower threshold. When the preset condition is matched, the peak-count determiner 222*a* of the classifying module 222 determines if the peak count of the spindle load record is larger than a peak-count upper threshold or smaller than a peak-count lower threshold. When the peak-count determiner 222*a* determines that the peak count of the spindle load record is larger than the peak-count upper threshold, the classifying module 222 determines that the present category is a chatter category and the parameter-to-be-collected information corresponding to the present category comprises a parameter for checking spindle-chatter, which may include a temperature of the spindle 310, a rotation speed of the spindle 310 and a pitch error compensation of the spindle 310. When the peak-count determiner 222*a* determines that the peak count of the spindle load record is smaller than the peak-count lower threshold, the classifying module 222 determines that the present category is a chipped category and the parameter-to-be-collected information corresponding to the present category comprises at least one parameter for checking spindle-chipped.

In some other embodiments, the information processing module 221 may perform determination according to the peak position of the spindle load record. A peak-position determiner 222*b* of the classifying module 222 may determine if the peak position of the spindle load record is in a preset peak interval. When the peak position of the spindle load record is not in the preset peak interval, the classifying module 222 determines that the present category is a tool wear category and the parameter-to-be-collected information corresponding to the present category comprises at least one parameter for checking spindle wear for example, a spindle vibration frequency of the spindle 310).

In some other embodiments, the information processing module 221 may perform determination according to the peak value of the spindle load record. A peak-value determiner 222*c* of the classifying module 222 may determine if the peak value of the spindle load record is larger than a peak-value upper threshold or smaller than a peak-value lower threshold. When the peak-value determiner determines that the peak value of the spindle load record is larger than the peak-value upper threshold, the classifying module 222 determines that the present category is an over-loading category and the parameter-to-be-collected information corresponding to the present category comprises a parameter for checking overloading. When the peak-value determiner 222c determines that the peak value of the spindle load record is smaller than the peak-value lower threshold, the classifying module 222 determines that the present category is a tool abnormal category and the parameter-to-be-collected information corresponding to the present category comprises at least one parameter for checking spindle abnormality.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for determining a status of at least one machine, wherein the at least one machine comprises a spindle, and the method comprises:

utilizing a processing unit to receive and record a plurality of spindle load values of the spindle in a period of time to generate a spindle load record of the spindle, and to determine if a preset condition is matched according to the spindle load record;

utilizing the processing unit to determine a present category corresponding to the spindle load record of the spindle when the preset condition is matched, and to obtain parameter-to-be-collected information corresponding to the present category; and utilizing the processing unit to obtain at least one value of at least one collected parameter of the machine according to the parameter-to-be-collected information corresponding to the present category, and to determine a status of the at least one machine according to the obtained value of the at least one collected parameter.

2. The method of claim 1 further comprising:

utilizing a storage unit to store a plurality of category records, wherein each of the category records comprises a category name and the spindle load record and the parameter-to-be-collected information corresponding to the category name; and wherein the processing unit determines one of the category names as the present category according to the spindle load record of the spindle and the category records.

3. The method of claim 2, wherein:

each of the category records further comprises a plurality of history for collected parameters corresponding to each of the category names, wherein the processing unit determines the status of the machine by determining if the obtained value of the at least one collected parameter matches any of values of the history corresponding to the present category, when matches, it is determined that the status of the at least one machine is the present category, and when not matches, the processing unit further determines one of the category names other than the present category as an updated present category after update according to the spindle load record of the spindle and the category records.

4. The method of claim 1, wherein the spindle load record comprises a wave diagram which represents the spindle load values of the spindle in the period of time, the preset condition is selected from a preset peak count, a preset peak position and a preset peak value, and the step of determine if the preset condition is matched according to the spindle load record comprises:

utilizing the processing unit to analyze the spindle load record of the spindle to obtain a peak count, a peak position or a peak value of the spindle load record ; and wherein the processing unit determines if the preset condition is matched by comparing the peak count of the spindle load record with the preset peak count, by comparing the peak position of the spindle load record with the preset peak position, or by comparing the peak value of the spindle load record with the preset peak value.

5. The method of claim 1, wherein the spindle load record of the spindle comprises at least one peak count, and the step of determining the present category corresponding to the spindle load record of the spindle and obtaining the parameter-to-be-collected information corresponding to the present category comprises:

utilizing the processing unit to determine if the peak count of the spindle load record is larger than a peak-count upper threshold or smaller than a peak-count lower threshold;

utilizing the processing unit to determine that the present category is a chatter category and the parameter-to-be-collected information corresponding to the present category comprises a parameter for checking spindle-chatter when the processing unit determines that the peak count of the spindle load record is larger than the peak-count upper threshold; and utilizing the processing unit to determine that the present category is a chipped category and the parameter-to-be-collected information corresponding to the present category comprises at least one parameter for checking spindle-chipped when the processing unit determines that the peak count of the spindle load record is smaller than the peak-count lower threshold.

6. The method of claim 1, wherein the spindle load record of the spindle comprises at least one peak position, and the step of determining the present category corresponding to the spindle load record of the spindle and obtaining the parameter-to-be-collected information corresponding to the present category comprises:

utilizing the processing unit to determine if the peak position of the spindle load record is in a preset peak interval; and utilizing the processing unit to determine that the present category is a tool wear category and the parameter-to-be-collected information corresponding to the present category comprises at least one parameter for checking spindle wear when the peak position of the spindle load record is not in the preset peak interval.

7. The method of claim 1, wherein the spindle load record of the spindle comprises at least one peak value, and the step of determining the present category corresponding to the spindle load record of the spindle and obtaining the parameter-to-be-collected information corresponding to the present category comprises:

utilizing the processing unit to determine if the peak value of the spindle load record is larger than a peak-value upper threshold or smaller than a peak-value lower threshold;

utilizing the processing unit to determine that the present category is an over-loading category and the parameter-to-be-collected information corresponding to the present category comprises at least one parameter for checking overloading when the processing unit determines that the peak value of the spindle load record is larger than the peak-value upper threshold; and utilizing the processing unit to determine that the present category is a tool abnormal category and the parameter-to-be-collected information corresponding to the present category comprises at least one parameter for checking spindle abnormality when the processing unit determines that the peak value of the spindle load record is smaller than the peak-value lower threshold.

8. The method of claim 1 further comprising:

when the status of the machine can not be determined according to the obtained value of the collected parameter, utilizing the processing unit to determine machine-parameter information other than the parameter-to-be-collected information, to obtain at least one value of at least one machine parameter of the machine according to the machine-parameter information, and to determine the status of the machine according to the obtained value of the collected parameter and the obtained value of the machine parameter.

9. A system for determining a status of at least one machine comprising:

a data communication interface for building a connection with at least one machine, wherein the machine comprises a spindle; and a processing unit for building a connection with the data communication interface, wherein the processing unit comprises:

an information processing module for receiving and recording a plurality of spindle load values of the spindle in a period of time to generate a spindle load record of the spindle, and for determining if a preset condition is matched according to the spindle load record ;

a classifying module for determining a present category corresponding to the spindle load record of the spindle when the preset condition is matched, and for obtaining parameter-to-be-collected information corresponding to the present category; and a determining module for obtaining at least one value of at least one collected parameter of the machine according to the parameter-to-be-collected information corresponding to the present category, and for determining a status of the at least one machine according to the obtained value of the at least one collected parameter.

10. The system of claim 9 further comprises:

a storage unit for storing a plurality of category records, wherein each of the category records comprises a category name and the spindle load record and the parameter-to-be-collected information corresponding to the category name; and wherein the classifying module determines one of the category names as the present category according to the spindle load record of the spindle and the category records.

11. The system of claim 10, wherein:

each of the category records further comprises a plurality of history for collected parameters corresponding to each of the category names;

the determining module determines the status of the machine by determining if the obtained value of the collected parameter matches any of the history corresponding to the present category;

when matches, the classifying module determines that the status of the at least one machine is the present category, when not matches, the classifying module further determines one of the category names other than the present category as an updated category after update according to the spindle load record of the spindle and the category records.

12. The system of claim 9, wherein the spindle load record comprises a wave diagram which represents the spindle load values of the spindle in the period of time, the preset condition is selected from a preset peak count, a preset peak position and a preset peak value, and the information processing module comprises:

an analyzer for analyzing the spindle load record of the spindle to obtain a peak count, a peak position or a peak value of the spindle load record ; and the information processing module determines if the preset condition is matched by comparing the peak count of the spindle load record with the preset peak count, by comparing the peak position of the spindle load record with the preset peak position, or by comparing the peak value of the spindle load record with the preset peak value.

13. The system of claim 9, wherein the spindle load record of the spindle comprises at least one peak count, and the classifying module comprises:

a peak-count determiner for determining if the peak count of the spindle load record is larger than a peak-count upper threshold or smaller than a peak-count lower threshold;

wherein the classifying module determines that the present category is a chatter category and the parameter-to-be-collected information corresponding to the present category comprises a parameter for checking spindle-chatter when the peak-count determiner determines that the peak count of the spindle load record is larger than the peak-count upper threshold; and wherein the classifying module determines that the present category is a chipped category and the parameter-to-be-collected information corresponding to the present category comprises at least one parameter for checking spindle-chipped when the peak-count determiner determines that the peak count of the spindle load record is smaller than the peak-count lower threshold.

14. The system of claim 9, wherein the spindle load record of the spindle comprises at least one peak position, and the classifying module comprises:

a peak-position determiner for determining if the peak position of the spindle load record is in a preset peak interval, wherein the classifying module determines that the present category is a tool wear category and the parameter-to-be-collected information corresponding to the present category comprises at least one parameter for checking spindle wear when the peak position of the spindle load record is not in the preset peak interval.

15. The system of claim 9, wherein the spindle load record of the spindle comprises at least one peak value, and the classifying module comprises:

a peak-value determiner for determining if the peak value of the spindle load record is larger than a peak-value upper threshold or smaller than a peak-value lower threshold;

wherein the classifying module determines that the present category is an over-loading category and the parameter-to-be-collected information corresponding to the present category comprises a parameter for checking overloading when the peak-value determiner determines that the peak value of the spindle load record is larger than the peak-value upper threshold; and wherein the classifying module determines that the present category is a tool abnormal category and the parameter-to-be-collected information corresponding to the present category comprises at least one parameter for checking spindle abnormality when the peak-value determiner determines that the peak value of the spindle load record is smaller than the peak-value lower threshold.

16. The system of claim 9, wherein:

when the determining module can not determine the status of the machine according to the obtained value of the collected parameter, the determining module determines machine-parameter information other than the parameter-to-be-collected information, obtains at least one value of at least one machine parameter of the machine according to the machine-parameter information, and determines the status of the machine according to the obtained value of the collected parameter and the obtained value of the machine parameter.

17. A non-transitory computer readable storage medium with a computer program to execute a method for determining a status of at least one machine, wherein the machine comprises a spindle, and the method comprises:

utilizing a processing unit to receive and record a plurality of spindle load values of the spindle in a period of time to generate a spindle load record of the spindle, and to determine if a preset condition is matched according to the spindle load record;

utilizing the processing unit to determine a present category corresponding to the spindle load record of the spindle when the preset condition is matched, and to obtain parameter-to-be-collected information corresponding to the present category; and utilizing the processing unit to obtain at least one value of at least one collected parameter of the machine according to the parameter-to-be-collected information corresponding to the present category, and to determine a status of the at least one machine according to the obtained value of the at least one collected parameter.

* * * * *